UNITED STATES PATENT OFFICE.

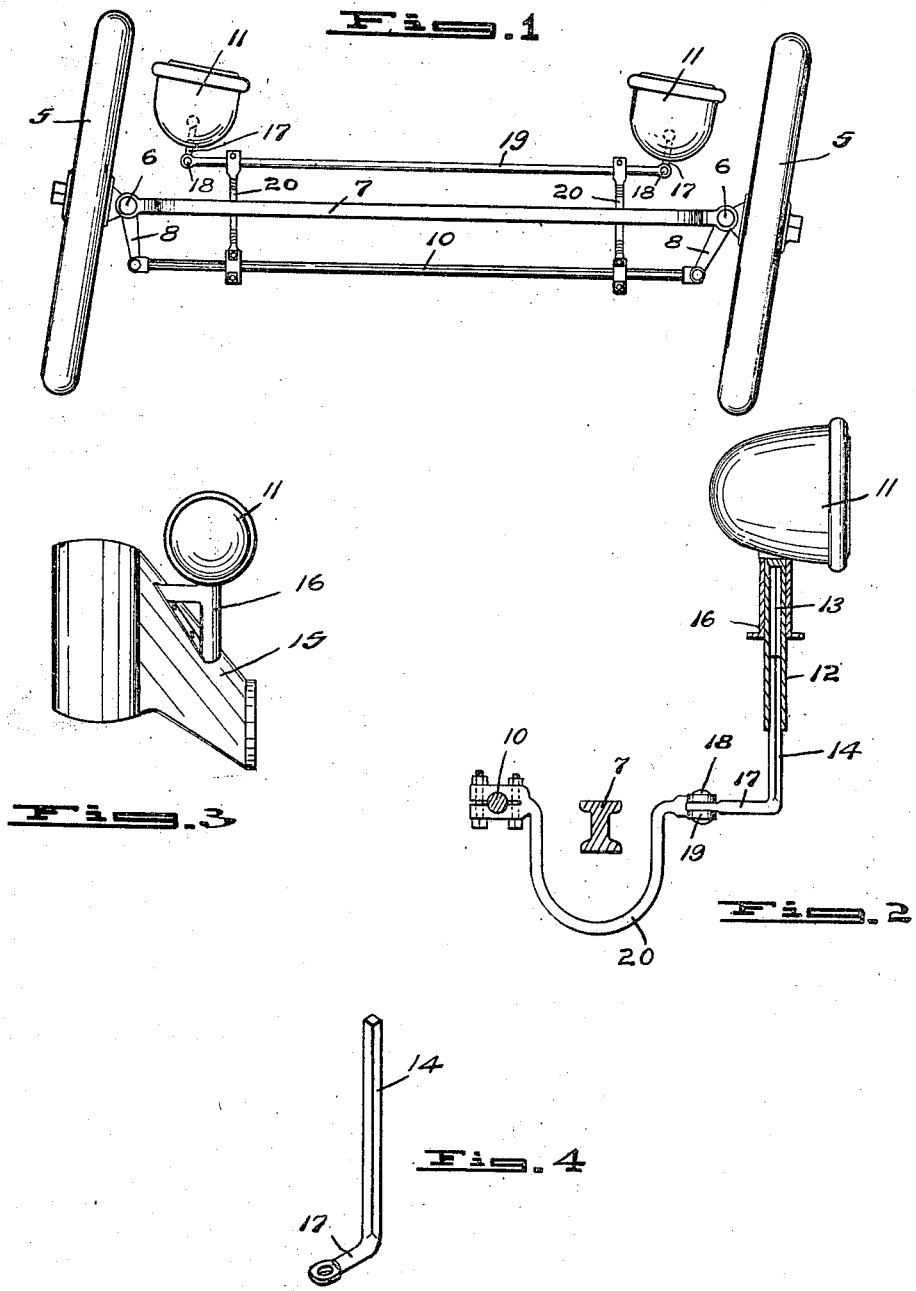

JOSEPH C. BONTRAGER, OF WENATCHEE, WASHINGTON.

HEADLIGHT-LAMP-ACTUATING MECHANISM.

1,310,387.　　　　Specification of Letters Patent.　　Patented July 15, 1919.

Application filed March 17, 1919. Serial No. 283,071.

*To all whom it may concern:*

Be it known that I, JOSEPH C. BONTRAGER, a citizen of the United States, and resident of Wenatchee, in the county of Chelan and State of Washington, have invented certain new and useful Improvements in Headlight-Lamp-Actuating Mechanism, of which the following is a clear and exact specification.

This invention relates to improvements in headlight lamps for motor vehicles and the object of this improvement is to provide headlight lamps that are connected with the steering mechanism of the vehicle and arranged to turn in the same direction that the vehicle is turned so that they will always illuminate the roadbed in front of the vehicle.

A further object is to provide strong, simple and efficient mechanism for connecting the headlight lamps with the steering mechanism of the vehicle to effect the turning of the lamps.

The invention resides in the novel construction, adaptation and combination of parts as will be more clearly hereinafter described and claimed.

In the accompanying drawings, Figure 1 is a somewhat diagrammatic plan view illustrating the manner of connecting my headlight lamps with the steering mechanism of a motor vehicle. Fig. 2 is a view partly in section and partly in side elevation showing the arrangement of the mechanism for supporting and turning the headlight lamps. Fig. 3 is a detached view in front elevation illustrating one manner of attaching my headlight lamp to the fender of a motor vehicle; and Fig. 4 is a view in perspective of a detail of the invention.

Like reference numerals designate like parts throughout the several views.

Referring to the drawings the numerals 5 designate the front wheels of a motor vehicle such wheels being connected by pivots 6 to an axle 7 in the usual maner and also being connected with steering arms 8 the outer ends of which are pivotally secured to a transverse steering bar 10 in such a manner that when the steering bar 10 is moved transversely of the frame the wheels 5 will be oscillated about the pivotal connection 6 to steer the vehicle.

All of the mechanism above described is of old and well known form. The present invention contemplates mechanism of simple and efficient form for connecting headlight lamps 11 with the transverse steering bar 10 in such a manner that when the wheels 5 are oscillated on the pivot 6 to steer the vehicle the lamps 11 will be oscillated in the same direction as the wheels thereby causing them to direct light upon the roadbed directly in front of the wheels regardless of the position into which the wheels are turned.

The lamps 11 are fixedly secured to shanks 12 that are provided with longitudinally extending square or irregularly shaped sockets 13 for the reception of squared or irregularly shaped turning members 14. The lamps 11 are preferably supported from the fenders 15 of the vehicle by means of tubular brackets 16 that fit over the shanks 12 as more clearly shown in Fig. 2, the exterior of the shanks 12 being cylindrical so that they may be rotated within the brackets 16.

The lower ends 17 of the turning members 14 are bent at substantially right angles to the squared portions thereof and are connected by pivots 18 with the ends of a transverse rod 19. The transverse rod 19 is preferably located just in front of the axle 7 and is rigidly connected by curved supports 20 with the transverse steering bar 10, one of the supports being disposed at each end of the rod 19 and the arrangement being such that when the steering bar 10 is moved cross-wise of the frame of the vehicle the bar 19 will be moved simultaneously therewith.

The squared portions of the turning members 14 are free to slide vertically within the sockets 13 thereby compensating for any relative movement between the portion of the vehicle to which the lamp is secured and the transverse steering rod 10 such as movement that may be permitted by springs that are interposed between the body and the axle.

The ends of the curved members 20 that connect with the transverse steering rod 10 are preferably bolted thereto or otherwise rigidly secured to the steering rod so that the weight of the curved member and parts connected therewith will be supported in substantially the position shown in Fig. 2 and not permitted to drop down.

In operation when the steering rod 10 is moved crosswise of the vehicle the rod 19 will be moved simultaneously therewith and will move the turning members 14 and shanks 12 thereby turning the lamps at substantially the same angle that the front wheels are turned to steer the vehicle and causing such lamps to illuminate the path that will be followed by the vehicle.

The mechanism herein disclosed is of relatively cheap and simple construction, is reliable in operation and will tend to lessen the danger of accidents due to the fact that it will always cause the light to be directed onto the path that the vehicle is about to follow.

It will be obvious that changes in the precise form of construction and arrangement of parts of this apparatus may be resorted to within the scope of the claims.

What I claim and desire to protect by Letters Patent is—

1. The combination with a motor vehicle having a transverse steering rod connecting the front wheels thereof and arranged parallel with and adjacent to the front axle, of curved members rigidly secured to said steering rod and extending underneath said axle, a transverse bar supported by said curved members in front of said axle, headlight lamps, a shank rigid with each lamp and having a longitudinal socket, means supporting said shanks for rotation, a turning member movable lengthwise in the socket in each shank and arranged to turn the shank and a crank arm on the lower end of said turning member said crank arm being pivotally secured to said transverse bar.

2. The combination with a motor vehicle having a transverse steering rod connecting the front wheels thereof and arranged parallel with and adjacent to the front axle, of curved members rigidly secured to said steering rod and extending underneath said axle, a transverse bar supported by said curved members in front of said axle, tubular lamp brackets secured to the body of the motor vehicle, headlight lamps, a shank secured to each of said headlight lamps and arranged to be rotatably supported in one of said tubular lamp brackets said shanks each having longitudinally extending square sockets, square turning members arranged to project into said sockets and crank arms formed on the lower end of said turning members and pivotally connected with the ends of said transverse bar whereby when said bar is moved crosswise of said frame said headlight lamps will be turned.

Signed at Seattle, Washington, this 7th day of March, 1919.

JOSEPH C. BONTRAGER.